June 15, 1948.  M. PARCARO  2,443,511
ELECTRONIC TUBE
Filed Dec. 13, 1944
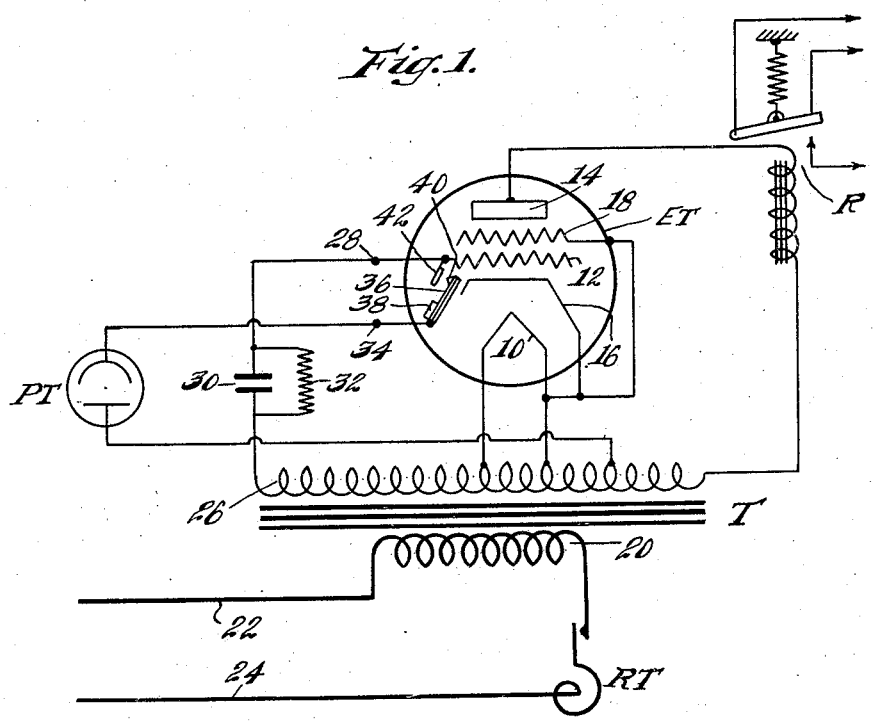
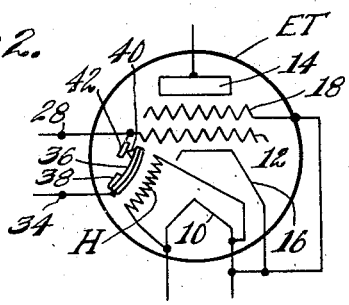
INVENTOR.
Michael Parcaro.
BY Bair & Freeman
Atty's.

Patented June 15, 1948

2,443,511

UNITED STATES PATENT OFFICE 2,443,511

ELECTRONIC TUBE

Michael Parcaro, Arlington, N. J., assignor to Penn Electric Switch Co., Goshen, Ind., a corporation of Iowa Application December 13, 1944, Serial No. 567,924

2 Claims. (Cl. 315—63)

This invention relates to an electronic tube wherein a thermostatic switch is provided for the purpose of preventing operation of the tube in response to a grid control circuit until such time as the temperature of the tube has risen to a satisfactory point for electronic flow from the cathode to the anode.

It is a known fact that the life of electronic tubes is comparatively short when they are continuously energized, that is, when the filament or heater is continuously energized so that the tube is always ready for oscillation immediately in response to a current change in the grid control circuit. For this reason the use of electronic tubes in automatically controlled circuits is more or less limited.

One method of prolonging the life of the tube is to energize it intermittently, that is, energize the filament or heater only when a control impulse is present in the grid control circuit, but when this is done there is present the objection of the electronic flow occurring in the tube at a time prior to the tube becoming heated to an efficient operating temperature, and due to this factor the life of the tube is considerably shortened. It is therefore an object of my invention to provide an intermittently energized electronic tube with a thermostatic switch within the tube responsive to the temperature rise thereof so that the grid control circuit is closed only after the temperature of the tube has risen to an efficient operating point.

Another object is to provide an electronic tube with two grid terminals, first, the usual grid bias terminal and second, a grid control terminal with the control grid in the tube directly connected with the grid bias terminal and the grid control terminal connected to the grid through a thermostatic switch responding either to the filament or heater of the tube or to an auxiliary heater which is energized by an initial control element only when a control function is to be performed.

With these and other objects in view, my invention consists in the construction, arrangement and combination of the various parts of my electronic tube whereby the objects contemplated are attained, as hereinafter more fully set forth, pointed out in my claims and illustrated in the accompanying drawings, wherein:

Figure 1 is an electro-diagrammatic view of my electronic tube showing one possible arrangement of controlling and controlled circuits used in connection therewith and Figure 2 is a modification of the tube, showing the thermostatic switch therein heated by an auxiliary heater instead of the filament or heater of the tube itself.

On the accompanying drawing I have used the reference character ET to indicate an electronic tube which may have the usual heater or filament 10, control grid 12 and plate 14. Electronic tubes are now usually provided with cathodes such as shown at 16, heated by the heater 10 and with grids such as shown at 18 which, however, are not necessary to the operation of my device but are shown merely by way of example.

The electronic tube ET is adapted to be intermittently energized (the heater or filament 10) only when it is desired to perform a control function. By way of example, the tube may be used in a photo-electronic burner primary control wherein the initial control is a room thermostat illustrated at RT on my drawing, and the room thermostat is adapted to control the flow of current to a primary coil 20 of a transformer T, the current being supplied from wires 22 and 24. The secondary coil 26 of the transformer T supplies current for the heater or filament 10, and for the grid and plate circuits as will hereinafter appear.

The tube ET is provided with a grid bias terminal 28 and a grid bias circuit is connected therewith which may have the usual condenser 30 and resistor 32 in its circuit and arranged parallel to each other. The grid bias circuit is continuously connected with the secondary coil 26 so that it is operated in its grid bias capacity whenever the primary coil 20 is energized.

The plate 14 may be connected with any suitable output device such as a relay R in the usual manner in connection with a system of the kind being described.

I provide in addition to the usual terminals of the electronic tube ET, a grid control terminal 34 independent of the grid bias terminal 28. Within the tube ET I mount a thermostatic switch consisting of a temperature responsive element 36 formed of bimetal or the like and rigidly connected to a bracket 38 at one end so that its other end will warp. Said other end carries a movable contact 40 which is engageable with a stationary contact 42 connected with the control grid 12 or the grid bias terminal 28. The bimetal 36 is adapted to warp counter-clockwise when heated. It receives its heat from the heater 10 and from the cathode 16 as well as being responsive to ambient heat within the tube ET whereby it is responsive to the temperature rise in the tube. The contacts 40 and 42 are set so that they engage only after an efficient operating temperature of the tube has been attained.

The terminal 34 has connected thereto any suitable grid control circuit such as the one illustrated including a photo-tube PT responding for instance to the flame in a furnace of a control system wherein the relay R serves, by way of example, as a combustion responsive switch.

In Figure 2 I illustrate a modification wherein a heater H is provided for the temperature responsive element 36 which is energized whenever the tube is energized as by shunting the heater or filament 10. The heater H is arranged adjacent the bimetal 36 or may be wound thereon depending upon the response desired.

In general it may be stated that the thermostatic switch is to close only when a satisfactory operating temperature for the tube has been attained so that the grid control circuit cannot function until there is high enough temperature to permit electronic flow of sufficient magnitude to prevent undue shortening of the life of the tube. If the electronic flow is permitted while the tube is still too cold, the life of the tube will be materially shortened whereas with my arrangement maximum life is assured and at the same time proper control in the tube is maintained by having the grid bias circuit constantly connected but the grid control circuit connected only when operating temperature of the tube is proper.

*Practical operation*

In the operation of my electronic tube; assuming the parts in the position of Figure 1, the room thermostat RT is open so that there is no current flow. Upon a call for heat, due to the room thermostat closing, the primary 20 becomes energized and so does the secondary 26. This energizes the heater or filament 10 so that the tube starts heating up and the grid bias circuit is ready for action, and so is the plate circuit. There can be no electronic flow however from the cathode to the plate, until the grid 12 is energized by the grid control circuit which is open at the contacts 40—42.

When the tube has reached proper operating temperature, the contacts 40 and 42 close so that the photo-tube PT is now operable in the grid control circuit to energize the grid (in the case of an oil burner as mentioned, if flame has appeared in the furnace to make the photo-tube conductive of sufficient current to cause the tube ET to oscillate). In that even, the relay R is pulled in for performing its function. Thus although the photo-tube PT may attain the operating point before the tube ET is warmed up to the proper temperature, the photo-tube cannot perform its control function until the electronic tube has heated to the point where the contacts contacts 40 and 42 are closed. This prevents undesirable electronic flow from the cathode to the plate before the electronic tube is properly heated and thereby avoids shortening the life of the tube due to such undesirable flow.

Some changes may be made in the construction and arrangement of the parts of my electronic tube without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In combination with an electronic tube of the character having the usual heater, grid cathode, plate, a grid bias circuit, and a grid bias terminal connected with said grid; a thermostatic switch within said tube and closable on temperature rise of said heater, and a grid control terminal independent of said grid bias terminal, said thermostatic switch being electrically connected between said grid and said grid control terminal only.

2. In an electronic tube having a heated cathode, a grid and a plate, and adapted to be intermittently energized, a temperature responsive switch within said tube and normally open, the heat of said heated cathode acting thereon to close said switch when the temperature thereof rises to a satisfactory point for electron flow from said cathode to said plate, and a grid control circuit connected with said grid and including said temperature responsive switch electrically independent of said cathode in series in said grid control circuit.

MICHAEL PARCARO.

REFERENCES CITED

The following references are of record in the file of this patent:

UNITED STATES PATENTS

| Number | Name | Date |
| --- | --- | --- |
| 2,128,117 | Braband | Aug. 23, 1938 |

FOREIGN PATENTS

| Number | Country | Date |
| --- | --- | --- |
| 400,161 | Great Britain | Jan. 14, 1932 |